United States Patent
Mohr et al.

(10) Patent No.: US 10,422,670 B2
(45) Date of Patent: Sep. 24, 2019

(54) FLOW METER HAVING A SENSOR CASING ARRANGED COAXIALLY WITH A MEASUREMENT TUBE

(71) Applicant: HORN GmbH & Co. KG, Flensburg (DE)

(72) Inventors: Jörg Mohr, Süderbrarup (DE); Oliver Holste, Handewitt (DE)

(73) Assignee: HORN GMBH & CO. KG, Flensburg (DE)

( * ) Notice: Subject to any disclaimer, the term of this patent is extended or adjusted under 35 U.S.C. 154(b) by 238 days.

(21) Appl. No.: 15/412,163

(22) Filed: Jan. 23, 2017

(65) Prior Publication Data
US 2017/0211955 A1 Jul. 27, 2017

(30) Foreign Application Priority Data
Jan. 22, 2016 (DE) .................. 10 2016 101 162

(51) Int. Cl.
G01F 1/11 (2006.01)
G01F 15/14 (2006.01)
G01F 1/115 (2006.01)

(52) U.S. Cl.
CPC .............. G01F 1/115 (2013.01); G01F 15/14 (2013.01)

(58) Field of Classification Search
None
See application file for complete search history.

(56) References Cited

U.S. PATENT DOCUMENTS 4,433,574 A * 2/1984 Williams ................ G01F 15/08
73/200
5,515,734 A * 5/1996 Malminen ................ G01F 1/22
73/861.46

(Continued)

FOREIGN PATENT DOCUMENTS

DE      37 03 117 A1    10/1987
DE      101 11 993 A1    9/2001
(Continued)

OTHER PUBLICATIONS

Espacenet English abstract of DE 102 49 566 A1.
(Continued)

*Primary Examiner* — Harshad R Patel
(74) *Attorney, Agent, or Firm* — Ladas & Parry LLP; Malcolm J. MacDonald

(57) ABSTRACT

A flow meter (10) for liquids, the meter having a measurement casing (12) with a first connection (20) and a second connection (22), a measuring unit (24) pivoted to the measurement casing (12), with a sensor element (26), a sensor casing (14) that can be coupled to the measurement casing (12) and which partially encompasses the measurement casing, with a sensor (28) that responds to the sensor element (26) for determining the quantity of liquid flowing through the measurement casing. To facilitate easy assembly and subsequent adjustment of the sensor casing (14) with a fixed measurement casing (12), the measurement casing (12) is designed as a measuring tube and has a closed cylindrical surface (38), and that the sensor casing (14) has a recess (46) matched to the cylindrical surface (38) and is arranged coaxially with the measurement casing (12) and pivoted to the latter in the circumferential direction.

14 Claims, 2 Drawing Sheets

(56) References Cited

U.S. PATENT DOCUMENTS

| | | | | |
|---|---|---|---|---|
| 5,721,383 A * | 2/1998 | Franklin | .................. | G01F 1/075 |
| | | | | 73/861.77 |
| 6,019,003 A * | 2/2000 | Wieder | ..................... | G01F 1/10 |
| | | | | 73/861.77 |
| 6,397,687 B1 * | 6/2002 | Garmas | ..................... | G01F 1/06 |
| | | | | 137/119.07 |
| 6,481,293 B1 * | 11/2002 | Walczak | .................. | G01F 1/115 |
| | | | | 73/861.77 |
| 8,336,398 B2 * | 12/2012 | Shih | ........................ | G01F 1/115 |
| | | | | 73/861.79 |
| 8,499,786 B2 * | 8/2013 | Zolock | ................. | G05D 7/0635 |
| | | | | 137/487 |
| 2003/0233203 A1 * | 12/2003 | Grumstrup | ................ | G01F 1/24 |
| | | | | 702/98 |
| 2005/0081642 A1 * | 4/2005 | Nehl | ....................... | G01F 1/115 |
| | | | | 73/861.79 |
| 2011/0174083 A1 * | 7/2011 | Berger | .................... | G01F 1/662 |
| | | | | 73/861.27 |
| 2012/0325016 A1 | 12/2012 | Peled | | |
| 2013/0061687 A1 * | 3/2013 | Rath | ....................... | G01F 15/14 |
| | | | | 73/861.25 |
| 2013/0263654 A1 * | 10/2013 | Pietron | .................. | G01L 3/101 |
| | | | | 73/115.02 |
| 2015/0059466 A1 * | 3/2015 | Adlon | ...................... | G01F 1/10 |
| | | | | 73/198 |
| 2015/0135851 A1 * | 5/2015 | Lauber | ................... | G01F 1/075 |
| | | | | 73/861.77 |
| 2015/0177034 A1 * | 6/2015 | Alekseyev | ................ | G01F 3/06 |
| | | | | 73/861.08 |
| 2015/0253163 A1 * | 9/2015 | Ruiz Cortez | .......... | G01F 1/075 |
| | | | | 73/198 |

FOREIGN PATENT DOCUMENTS

| | | |
|---|---|---|
| DE | 102 49 566 A1 | 5/2004 |
| EP | 2 154 490 A1 | 2/2010 |
| JP | 2009-63467 A | 3/2009 |
| WO | 2008/105330 A1 | 9/2008 |
| WO | 2011/055362 A1 | 5/2011 |
| WO | 2014/006001 A1 | 1/2014 |

OTHER PUBLICATIONS

Non-English European Search dated Jun. 20, 2017 for Application No. EP 17 15 2202.
Espacenet English abstract of JP 2009-63467 A.

* cited by examiner

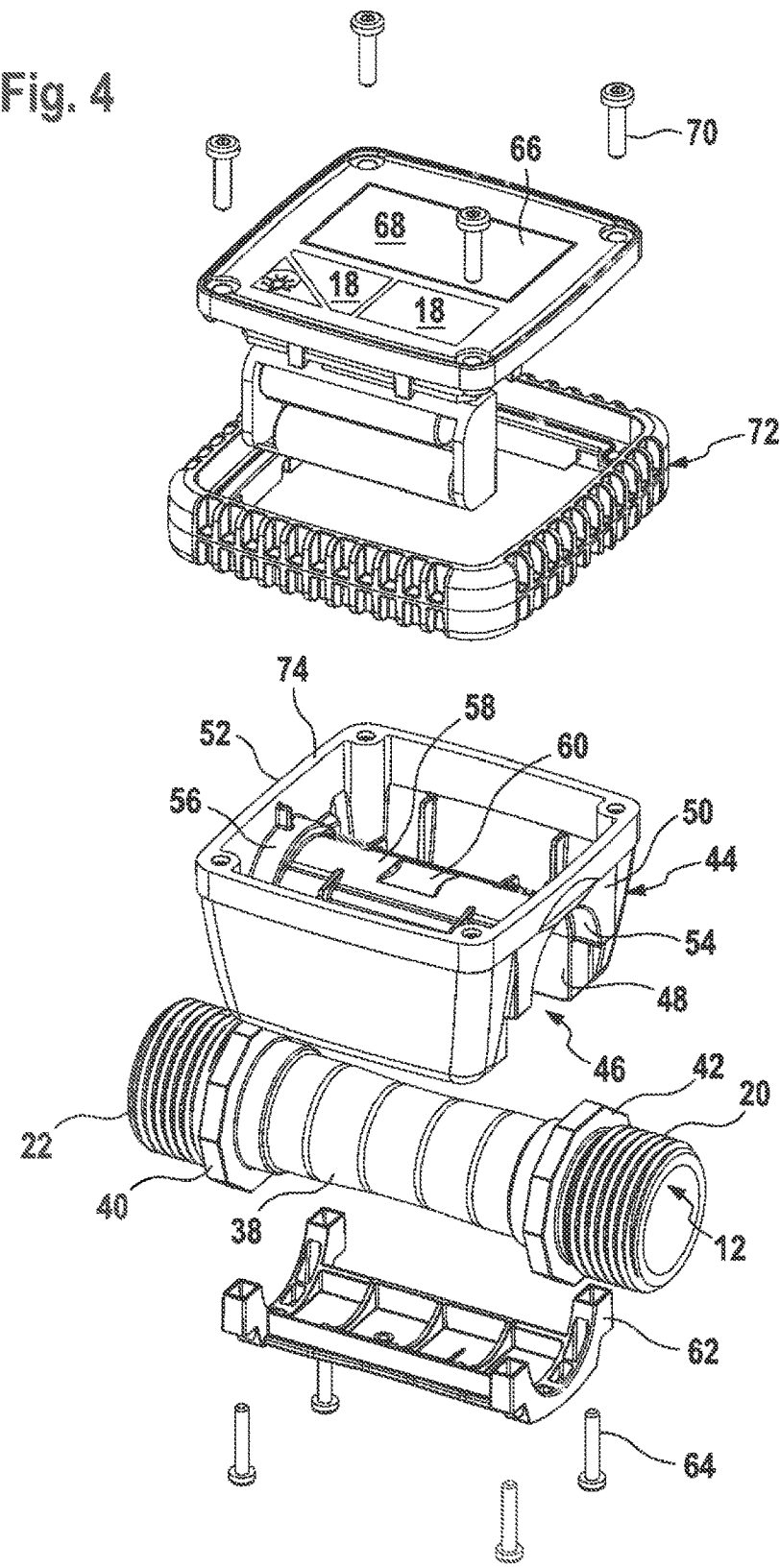

FLOW METER HAVING A SENSOR CASING ARRANGED COAXIALLY WITH A MEASUREMENT TUBE

SUMMARY OF THE INVENTION

This application claims priority to German Patent Application 10 2016 101 162.2, filed Jan. 22, 2016, the contents of which are incorporated herein by reference.

The invention relates to a flow meter for liquids, comprising a measurement casing with a first connection such as an inlet and a second connection such as a drain, a measuring unit, e.g. impeller or turbine wheel, which is pivoted to the measurement casing, with at least one sensor element, like a magnet, a sensor casing that can be coupled to the measurement casing and at least partially encompasses the measurement casing, with at least one sensor, which responds to the sensor element for determining the quantity of liquid flowing through the measurement casing as a result of the revolutions of the measuring unit.

BACKGROUND OF THE INVENTION

A flow meter of the type mentioned at the outset is described in WO 2014/006001 A1. In the case of known embodiment, the measurement casing is inserted into a recess of the sensor casing, wherein the outer contour of the measurement casing and the recess are configured essentially rectangular-shaped. Consequently, a rotation of the sensor casing is prevented in the circumferential direction relative to the measurement casing. A readjustment of the sensor casing in the circumferential direction with a permanently installed measurement casing is thus not possible.

DE 102 49 566 A1 relates to a flow meter, which responds differently to forward and reverse flows. The flow meter has a two-part housing. Its inlet-side housing part is designed in tubular fashion and is fitted with a tube extension in a corresponding intake area of a second output-side housing part. For sealing between the housing parts, the first housing part is provided with annular grooves that open outwardly in a radial manner, which are located in the O-rings.

WO 2008/105330 A1 relates to a flow meter with two tubular housing parts, wherein an impeller is arranged in the first housing part. Each of the housing parts has a connection for a pipe at the end. The housing parts can be connected to one another, whereby a seal is provided between the housing parts.

EP 2 154 490 A1 relates to a flow meter for liquids with a measurement casing with a first connection and a second connection, whereby a sensor casing is coupled firmly to the measurement casing.

To this end, the present invention is based on the task of further developing a flow meter of the type mentioned at the outset in such a way that the assembly of the measurement casing and of the sensor casing is simplified.

According to the invention, the object is achieved as described below.

The measurement casing is designed as a measuring tube and has a closed cylindrical surface, wherein the sensor casing has a recess adapted to the cylindrical surface and is arranged coaxially with the measurement casing and can be swivelled in the circumferential directions.

The embodiment, according to the invention, is distinguished from the state of the art in that the measurement casing can be installed in a measuring position in any desired angular position, since the sensor casing can be rotated on the permanently mounted measurement casing, even later in a position, which is, for example, used for reading a display unit. The sensor casing can be mounted on the measuring tube, independent of the angular position of the measuring tube and fixed in any desired angular position.

The fixing of the sensor casing preferably takes place by means of a clamping element in any angular position relative to the circumferential direction of the measurement casing.

In order to prevent the movement of the sensor casing in axial direction of the measurement casing, it is provided that the cylindrical surface area of the measurement casing is limited in axial direction by the limiting means such as circumferential flanges. The flanges can fit closely at the side walls of the sensor casing or the side walls can have slots, which accommodate the circumferential flanges.

In order to achieve an optimum signal transmission on the one hand and a high stability on the other, it is provided that a wall thickness of the cylindrical surface area of the measuring tube is conical, whereby a wall of the measuring tube has a smaller wall thickness in the area of the measuring unit than in the area of the circumferential flanges.

According to a further preferred embodiment, it is provided that the sensor casing has a measuring window in the area of the sensor, which is designed as a recess or as a section with low wall thickness.

The wall of the measuring tube and the measuring window of the sensor casing are made of a material, which is permeable to electromagnetic radiation.

In order to achieve a close coupling between the cylindrical surface area of the measuring tube and the inner wall of the sensor casing, it is foreseen that a surface of the recess of the sensor casing facing the cylindrical surface area is matched to a contour of the surface area of the measurement casing.

According to a further preferred embodiment, it is provided that the flow meter is designed as a compact flow meter, that is to say, an evaluation electronics, a display unit with operating elements and/or a power supply is arranged in the sensor casing, in addition to the sensor. Said sensor casing thus assumes the function of a transmitter for the non-contacting and cordless detection of a flow of liquids through the measuring tube.

In order to achieve a compact design, the sensor is arranged on a support, such as a circuit board, which is detachably arranged in the sensor casing.

Preferably, the sensor is arranged on a lower side of the support facing the measuring unit in the area of the measuring window.

The sensor is preferably designed as a reed contact, which detects the rotation of the measuring unit, which is preferably embodied as a magnet.

Further details, advantages and features of the invention result not only from the claims that can be had from the characteristics—for themselves and/or in combination—but also from the following description of a preferred exemplary embodiment to be taken from the drawings.

BRIEF DESCRIPTION OF THE DRAWINGS

Shown in the following are:
FIG. 4: an exploded view of the flow meter,

DETAILED DESCRIPTION OF THE INVENTION

Figure 1:
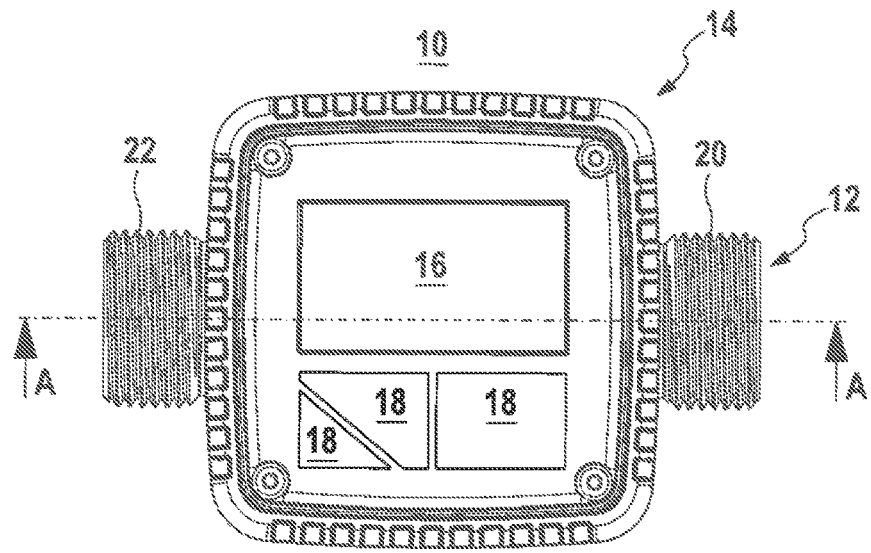
FIG. 1: a plan view of the flow meter
Figure 2:
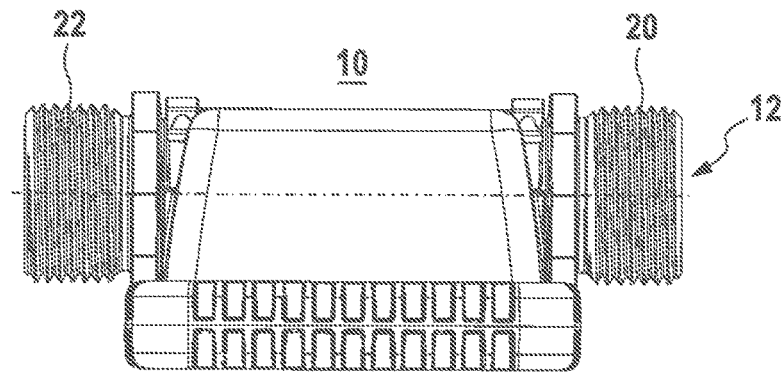
FIG. 2: a frontal view of the flow meter.

FIG. 1 and FIG. 2 show in front and top view a flow meter 10 for liquids comprising a measurement casing 12 designed as a measuring tube and a sensor casing 14 connected detachably to the measurement casing 12 for non-contacting and cordless detection of the flow with the display unit 16 and the control elements 18 The sensor casing 14 is disposed in a swivelling manner on the measurement casing 12 in the circumferential direction.

Figure 3:
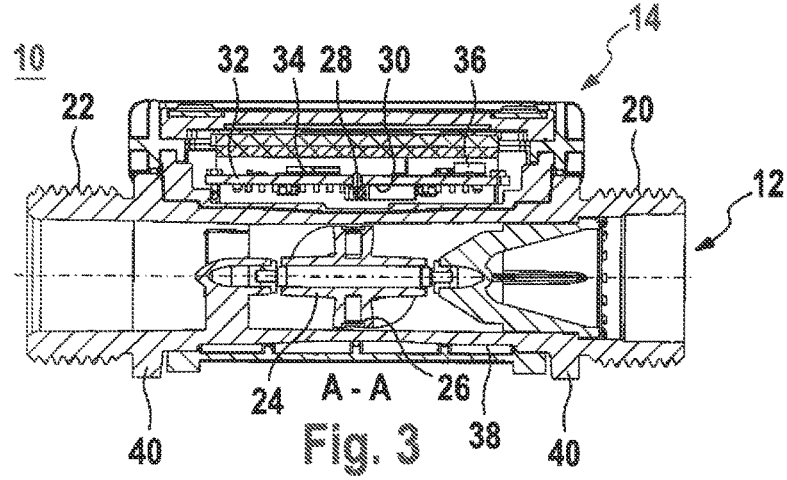
FIG. 3: a sectional view of the flow meter along the intersecting line A-A according to FIG. 1.

FIG. 3 shows a sectional view of the flow meter 10 along the intersecting al line A-A according to FIG. 1. The measurement casing 12 is designed as a measuring tube, in which a measuring unit 24 is pivoted in the form of a turbine wheel or impeller. At least one sensor element 26 in the form of a magnet is associated with the turbine wheel so that the rotation of the turbine wheel 24 is recorded in a contactless manner in any desired circumferential position of the sensor casing 14 relative to the measuring tube by means of a sensor 28 located in the sensor casing 14 such as reed contact and indicated as a flow The sensor 28 is arranged on an underside 30 of a support element 32, such as a circuit board, facing the measuring unit 24. On an upper side 34 of the support element 32, evaluation electronics 36 as well as the display unit 16 and the operating elements 18 are provided.

FIG. 4 shows an exploded view of the flow meter 10. The measurement casing 12 designed as a measuring tube has an essentially cylindrical surface 38, which is restricted on the edge by circumferential flanges 40, 42. The connection 20 is connected as an inlet pipe to the flanges 40, 42, and/or the connection 22 is connected as an outlet pipe in the form of threaded connections.

The housing 14 is designed in several parts and comprises a base body 44 for accommodating the sensor 28 as well as the evaluation electronics 34 with display unit 16 and control elements 18. The basic body 44 has a cylindrical recess 46 with a surface 48, which essentially corresponds to a contour of the surface 38 of the measuring tube, as shown in the sectional view according to FIG. 3.

Further, slots 54, 56 are provided in side walls 50, 52 of the basic body 44, in which the flanges 40, 42 are incorporated when the base body 44 is placed on the measurement casing 12. This prevents displacement of the sensor casing 14 in the axial direction of the measuring tube.

A measuring window 60 is formed in a wall 58 of the recess 46. The measuring window can be designed as a recess or as a wall with a low wall thickness. The measuring window 60, on the one hand, is aligned with the position of the sensor 28 and, on the other, with the position of the measuring unit 24.

The basic body 44 is fitted onto the measuring tube 12 and can be rotated in the circumferential direction on the measuring tube 12. The fixing of the base body 44 is effected by means of a fixing element 62 in the form of a clamping cover, which can be connected to the base body 44 by means of securing means 64 such as screws. Consequently, the sensor casing 14 can be fixed in any desired angular position.

The basic body 44 can be closed by a cover 66, in which a transparent area 68 is arranged for viewing the display unit 16 as well as the operating elements 18. The cover 66 can be connected to the main body 44 by means of securing elements 70 such as screws. A connecting point between the cover 66 and the base body 44 is preferably surrounded by a peripheral impact protection element 72, which can be clamped between the cover 66 and an upper edge 74 of the basic body 44.

What is claimed is:

1. A flow meter for a liquid, comprising:
    a measuring tube defined by a closed cylindrical surface, and comprising an inflow connection and an outflow connection;
    a measuring unit rotatably mounted in the measuring tube, and enclosed by the closed cylindrical surface,
    a magnet disposed in the measuring unit;
    a sensor casing detachably connected to, and coaxially arranged with, the measuring tube,
    wherein the sensor casing is rotatable around the closed cylindrical surface of the measuring tube about a longitudinal axis of the measuring tube;
    a sensor disposed in the sensor casing;
    wherein the sensor casing comprises a longitudinal recess corresponding to the closed cylindrical surface of the measuring tube, and coaxially arranged with the measuring tube;
    a clamping element configured to non-rotatably fix the sensor casing at any angular position relative to the measuring tube;
    wherein the sensor responds to revolutions of the measuring unit to determine a quantity of the liquid flowing through the measuring tube;
    wherein the measuring tube comprises a first circumferential flange associated with the inlet connection, and a second circumferential flange associated with the outlet connection;
    wherein the sensor casing is disposed on the measuring tube in a region between the first circumferential flange and the second circumferential flange; and
    wherein an axial rotation of the sensor casing about the measuring tube is restricted by the first circumferential flange and the second circumferential flange;
    wherein, from an area where the measuring unit is mounted, the closed cylindrical surface of the measuring tube expands as a conical shape in both directions towards the first circumferential flange and the second circumferential flange; and
    wherein a thickness of a wall of the measuring tube in the area where the measuring unit is mounted is less than a thickness of a wall of the measuring tube in a first area adjacent to the first circumferential flange and a second area adjacent to the second circumferential flange.

2. The flow meter according to claim 1, wherein the clamping element is in a form of a clamping cover.

3. The flow meter according to claim 2, wherein a surface of the longitudinal recess is matched to a contour of an opposing surface of the closed cylindrical surface.

4. The flow meter according to claim 1, wherein the sensor casing comprises a measuring window disposed in an area adjacent to the sensor.

5. The flow meter according to claim 4, wherein the circumferential wall of the measuring tube and the measuring window are formed from a material which is permeable to electromagnetic radiation.

6. The flow meter according to claim 1, wherein the sensor casing further comprises evaluation electronics, and a display unit with operating elements.

7. The flow meter according to claim 1, wherein the sensor is arranged on a support, which is detachably disposed in the sensor casing.

8. The flow meter according to claim 7, wherein the sensor casing comprises a measuring window in an area adjacent to the sensor; and
    wherein the sensor is arranged on a side of the support in an area proximate to the measuring window.

9. The flow meter according to claim 7, wherein the support is a circuit board.

10. The flow meter according to claim 1, wherein the sensor is configured as a reed switch.

11. The flow meter according to claim 1, further comprising:
- a first slot formed in a side wall of the sensor casing;
- a second slot formed in an opposing side wall of the sensor casing;
- wherein the first slot engages with the first circumferential flange, and the second slot engages with the second circumferential flange, when the measuring unit is mounted on the measuring tube.

12. The flow meter according to claim 1, wherein the inlet connection and the outlet connection are threaded connections.

13. The flow meter according to claim 1, wherein the measuring unit is an impeller or turbine.

14. The flow meter according to claim 1, wherein the measuring unit is mounted on the longitudinal axis of the measuring tube.

* * * * *